United States Patent [19]

Suda et al.

[11] Patent Number: 4,963,912
[45] Date of Patent: Oct. 16, 1990

[54] CAMERA APPARATUS HAVING MEANS FOR SETTING THE POSITION OF AN OPTICAL GRATING AT A DESIRED LOCATION IN THE VIEWFINDER

[75] Inventors: Yasuo Suda; Masaki Higashihara, both of Yokohama, Japan

[73] Assignee: Canon Kabushiki Kaisha, Tokyo, Japan

[21] Appl. No.: 281,780

[22] Filed: Dec. 9, 1988

[30] Foreign Application Priority Data

Dec. 14, 1987 [JP] Japan ................................. 62-315535
Dec. 14, 1987 [JP] Japan ................................. 62-315536
Dec. 14, 1987 [JP] Japan ................................. 62-315537
Dec. 14, 1987 [JP] Japan ................................. 62-315538

[51] Int. Cl.⁵ ............................................. G03B 13/00
[52] U.S. Cl. ..................................... 354/404; 354/406
[58] Field of Search ................ 354/404, 405, 406, 407

[56] References Cited

U.S. PATENT DOCUMENTS 4,047,022 9/1977 Holle .................................... 250/201
4,643,557 2/1987 Ishiazaki et al. ..................... 354/406
4,698,492 10/1987 Ohtaka et al. ....................... 354/407

Primary Examiner—L. T. Hix
Assistant Examiner—Gray, David M.
Attorney, Agent, or Firm—Fitzpatrick, Cella, Harper & Scinto

[57] ABSTRACT

A camera apparatus having means for setting an optical grating at a desired location in the viewfinder includes a viewfinder for observing a prospective image plane of an objective lens, a light dividing mirror for reflecting the light toward the viewfinder, and a scanning plate having a reflective optical grating thereon for scanning the image of an object on the prospective image plane. Light receiving circuitry is provided for receiving light reflected by the optical grating through the light dividing mirror, and for forming an electrical signal representing the focus adjusting state of the objective lens. Structure is provided for setting the optical grating in a desired position in the viewing field of the viewfinder.

16 Claims, 11 Drawing Sheets

CAMERA APPARATUS HAVING MEANS FOR SETTING THE POSITION OF AN OPTICAL GRATING AT A DESIRED LOCATION IN THE VIEWFINDER

BACKGROUND OF THE INVENTION

1. Field of the Invention

The present invention relates to a single lens reflex camera in which the light from an object, passing through a photographing lens, is guided through a half mirror to a photoelectric converting element, and the signal therefrom is used for detecting object information utilized in photographing, such as focus information and light measurement information.

2. Related Background Art

As disclosed in the U.S. Pat. No. 4,047,022 and in the Japanese Patent Publication No. 60-32846, there is already known a focus detecting device using the so-called collephoto method, in which the focus state of an imaging lens is detected by placing a slit member having plural slit apertures of a predetermined pitch in the vicinity of the anticipated focal plane of the imaging lens or a plane equivalent thereto, vibrating said slit member in a direction perpendicular to the optical axis of said imaging lens or a direction of the array of said slit apertures, and determining the phase difference of two images of the object, entering a set of photosensors positioned therebehind.

However the distance measurement in such a device is limited to the center of the viewing field, namely to an area on the optical axis of the imaging lens. Therefore, the distance measurement can be conducted without problem if the object of focus detection is positioned at the center of the viewing field, but appropriate focusing operation cannot be achieved as precise distance information is not obtained if the object is not at the center of the viewing field at the distance measuring operation. In consideration of this fact, assignee of the present applicants already proposed, in U.S. patent application Ser. No. 162,575, a device enabling focus detection at a desired position by moving the distance measuring area in the viewing field.

However, if such proposed device is to be incorporated in the body of a single lens reflex camera, with an optical system arrangement consisting of a photographing lens, a main movable mirror, an auxiliary movable mirror and a focus detecting system positioned in the bottom of the mirror box as employed in the conventional single lens reflex camera, the movable range of the measuring area in the viewing field is limited by the size or position of the auxiliary movable mirror. Thus, in practice, there is encountered a case where said distance measuring area can be moved only in a very limited range.

Figure 14:
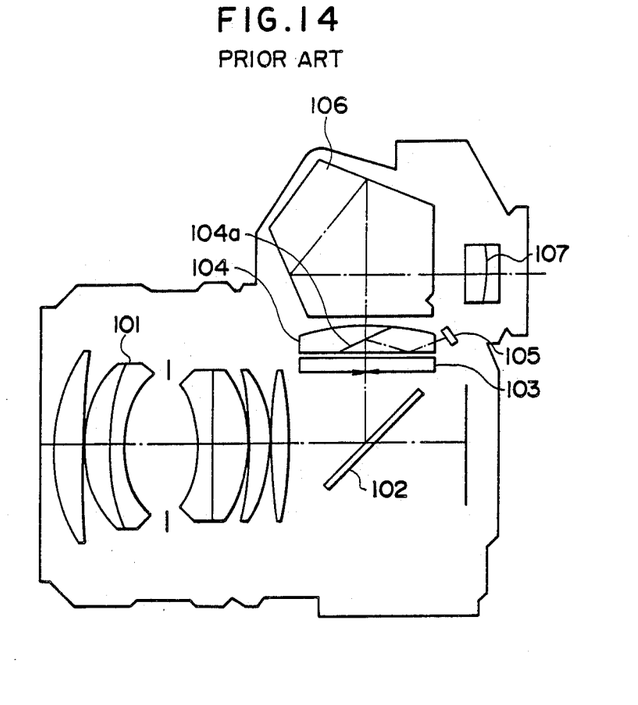
FIG. 14 is a cross-sectional view of a conventional single lens reflex camera.

FIG. 14 is a cross-sectional view of a conventional single lens reflex camera in which the light coming from the object passes through a photographing lens 101, is deflected by a movable mirror 102 to form an image of the object on a focusing plate 103, is then diffused therein and enters a condenser lens 104 positioned therebehind. The light is divided into two portions, one being reflected by a half mirror, then wholly reflected by the bottom of the condenser lens 104 and guided to a photosensor sensor 105, while the other is transmitted by said half mirror and guided through a pentagonal prism 106 to an eyepiece 107.

In the camera of such structure, the vertical dimension of the camera can be reduced without imparing the functions by placing said condenser lens 104 in front of the focusing plate 103, if such dimensional reduction is required for example by the design. However, in such structure with the condenser lens 104 positioned between the photographing lens 101 and the focusing plate 103, the image of the object focused on said focusing plate 103 is distorted, so that the focusing state can be confirmed at the central portion of the viewing field.

Also the assignee of the present applicants has disclosed, in another patent application, a camera provided with a light reflecting surface in a part of the light entering face (imaging face) of the focusing plate or an equivalent surface, wherein the light reflected from said reflecting surface is guided to a focus detecting system (or a light measuring system) provided at the bottom of the mirror box, for detecting the information on distance (or on light intensity). However, such camera is also associated with a drawback of distorted image of providing a the object on the focusing plate, because the condenser lens is positioned between the photographing lens and the focusing plate, for example in order to utilize said condenser lens both in the finder system and in the focus detecting system.

SUMMARY OF THE INVENTION

An object of the present invention is to expand the movable range of the measuring area of the focus detecting device incorporated in a camera body, without increasing the dimensions thereof.

Another object of the present invention is to securely separate light fluxes utilized for the focus detection, at the position of the pupil of the photographing lens.

Still another object of the present invention is to cause a mark, indicating the measuring area, displayed in the viewing field of a viewing finder, to coincide exactly with the actual measuring area.

Still another object of the present invention is to provide a finder system of improved performance, allowing the focusing state of the object to be confirmed even in areas other than the central area of the focusing screen.

DETAILED DESCRIPTION OF THE PREFERRED EMBODIMENTS

Now, the present invention will be clarified by embodiments thereof shown in the attached drawings.

Figure 1:
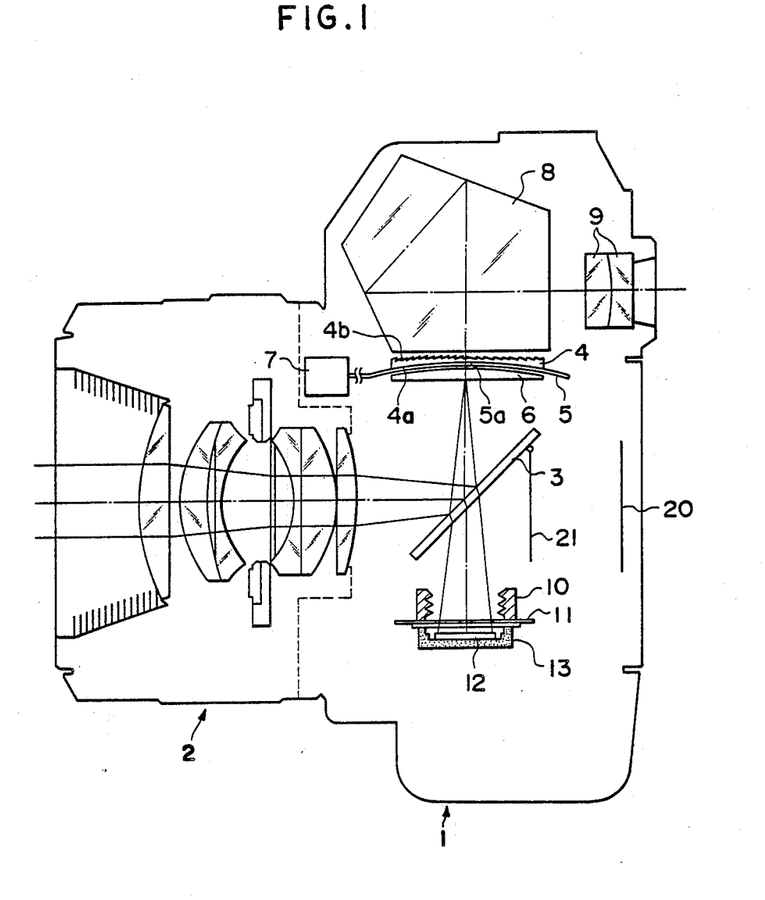
FIG. 1 is a cross-sectional view of a single lens reflex camera constituting an embodiment of the present invention.

FIG. 1 is a longitudinal cross-sectional view of a single lens reflex camera constituting an embodiment of the present invention, wherein shown are a camera body 1; a photographing lens 2 permanently or detachably fixed on said camera body; a movable half-transparent mirror 3 having a transmission characteristic for transmitting 50% of the incoming light and reflecting the remainder of said light; a focusing screen 4 with a spherical matted light entrance face 4a, and a light exit face 4b constituting a Fresnel lens; and a transparent oscillating plate 5 of a spherical form corresponding to that of said light entrance face 4a and integrally provided with light reflecting slit areas 5a (FIG. 2) for wholly reflecting the light incident to said light entrance face 4a and functioning as a reflective optical grating.

Figure 2:
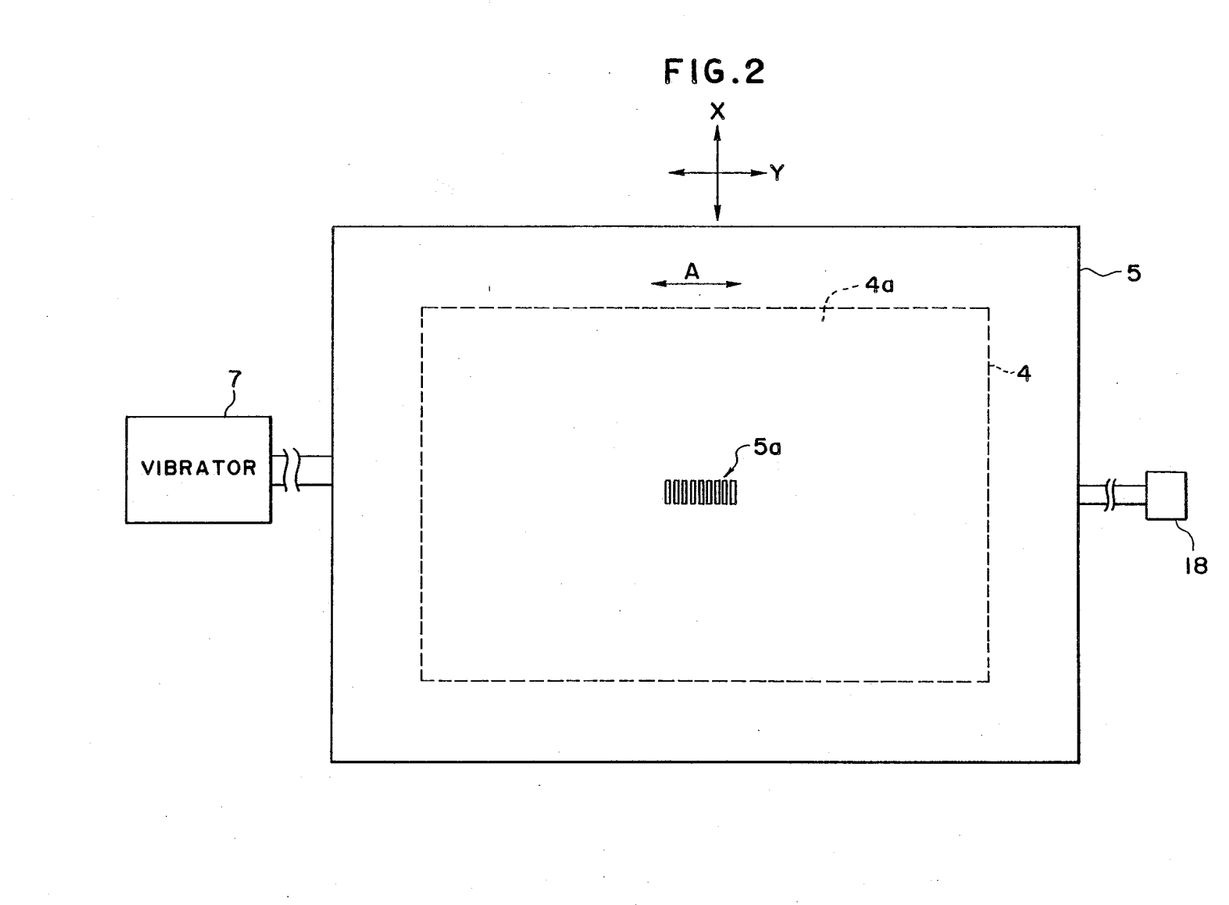
FIG. 2 is a plan view of an oscillating screen provided with a light reflecting member, and a focusing screen shown in FIG. 1.

There are further shown a condenser lens 6 positioned in the optical path of the entering light and reflected by said light reflecting areas 5a and serving not only as the condenser lens for the finder optical system but also as an element in the focus detecting optical system; an oscillating mechanism 7 for oscillating said light reflecting areas 5a through said oscillating plate 5, in a direction A (see FIG. 2); a pentagonal prism 8; an eyepiece 9; and an operating member 18 (shown in FIG. 2) for moving the light reflecting areas 5a of said oscillating plate 5 in directions X and Y shown in FIG. 2, thereby enabling the operator to move the oscillating plate 5 along the plane thereof for arbitrarily selecting the light reflecting areas 5a in the viewing field. The oscillating mechanism 7 is rendered movable together with the oscillating plate 5.

Figure 3:
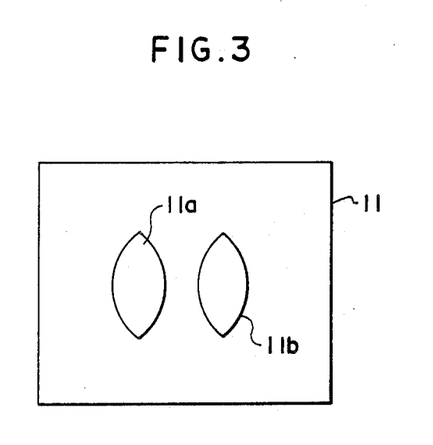
FIG. 3 is a plan view of a diaphragm plate.
Figure 4:
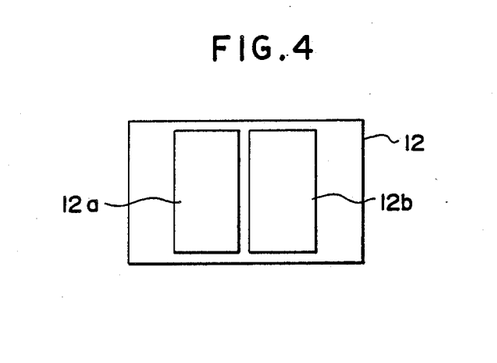
FIG. 4 is a plan view of photosensors.

There are further shown a light shield cover 10 for eliminating undesirable light; a diaphragm plate 11 having two apertures 11a, 11b as shown in FIG. 3; a photosensor 12 having two photosensor elements 12a, 12b as shown in FIG. 4; and a support member 13 for supporting said photosensor 12.

In the above-explained structure, the light coming from an object and passing through the photographing lens 2 is half reflected upwards by the movable mirror 3, then transmitted by the condenser lens 6, and is focused as an image of the object on the plane of the light reflecting areas 5a, namely on the light entrance face 4a of the focusing screen 4. Said light entrance face 4a of said focusing screen 4 is formed spherical, since the image plane of the photographing lens 2 is curved by the condenser lens 6. Thus said light entrance face 4a of the focusing screen 4 is formed corresponding to the thus curved image plane, thereby allowing the operator to observe, through the eyepiece 9, an image equivalent to that focused on the photographic film.

The light from the object, entering the light entrance face 4a of said focusing screen and not reflected by the light reflecting areas 5a, is transmitted by the light exit face 4b constituting a Fresnel lens, then guided through the pentagonal prism 8 and the eyepiece 9, and is utilized for observation of the image of the object. In said observation, the shadows of the light reflecting areas 5 serve as a mark indicating the position of detection. On the other hand, the light coming from the object and reflected by said light reflecting areas 5a is again transmitted by the condenser lens 6, then guided through the movable mirror 3 and the diaphragm plate 11, and received by the photosensor elements 12a, 12b of the photosensor 12, for conversion into electrical signals.

There are further shown in FIG. 1 the position of a photographic film 20; and a mask 21 for covering the movable mirror 3 when it is swung upwards, thereby intercepting the light inversely introduced from the eyepiece 9.

Figures 5, 6:
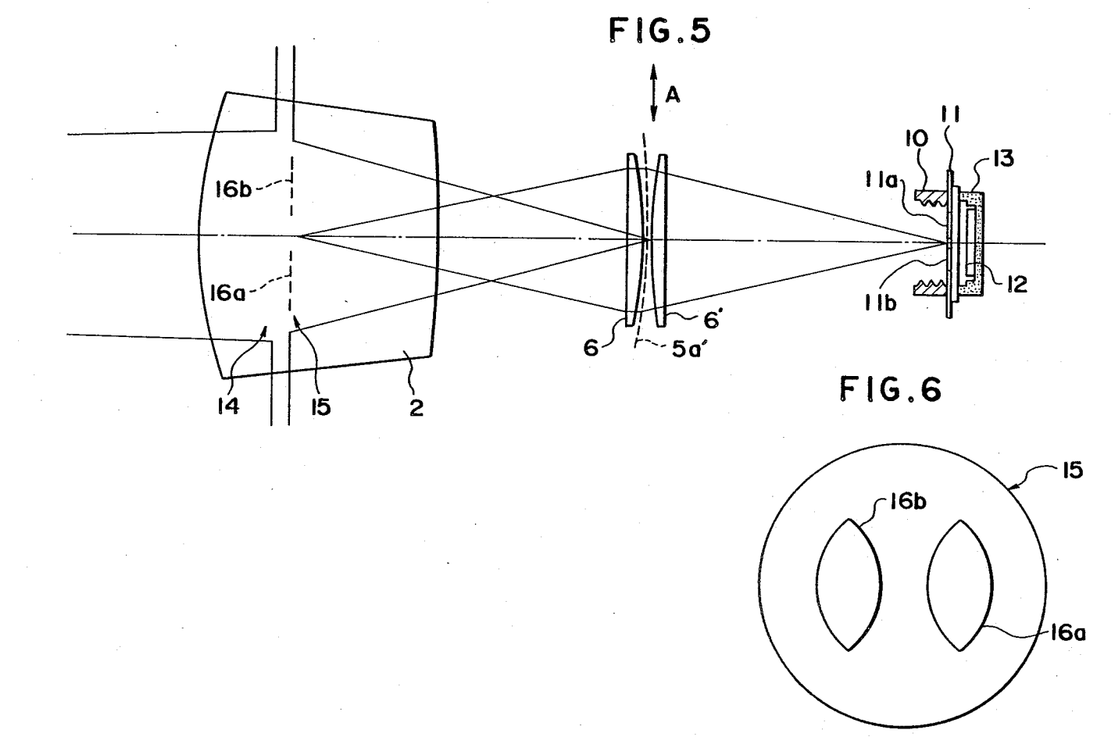
FIG. 5 is a developed view of the optical path of a focus detecting system.
FIG. 6 is a view showing the division of exit pupil of the a photographing lens.

FIG. 5 is a view showing the parts relating to the focus detection, in which the entering and reflected optical paths are shown in extended manner. In this drawing there are shown an imaginary plane 5a' indicating the extension of the light reflecting areas 5a; a return optical plane 6' of the condenser lens 6; an entrance pupil 14 of the photographing lens 2; and an exit pupil 15 thereof.

The light from the object enters the entrance pupil 14, then emerges from the exit pupil 15 and is focused on the imaginary plane 5a'. Also the condenser lens 6, the return plane 6' thereof and the imaginary plane 5a' project the images of the apertures 11a, 11b of the diaphragm plate 11 in the exit pupil 15 of the photographing lens 2. This is represented in FIG. 6, in which 16a and 16b indicate the images of the apertures 11a, 11b of the diaphragm plate 11. Therefore, the light entering the light entrance face 4a of the focusing screen 4 through said image 16a and reflected by the light reflecting areas 5a passes through the aperture 11a of the diaphragm 11 and is received by the photosensor element 12a of the photosensor 12. Also, the light passing through said image 16b and reflected by the light reflecting areas 5a passes through the aperture 11b of the diaphragm 11 and is received by the photosensor element 12b. At the same time, the oscillating plate 5, of which light reflecting areas 5a are positioned at the center of the viewing field by the operating member 18 as shown in FIG. 2, performs an oscillating motion in the direction A, as shown in FIGS. 2 and 5, caused by the oscillating mechanism 7.

Figure 7:
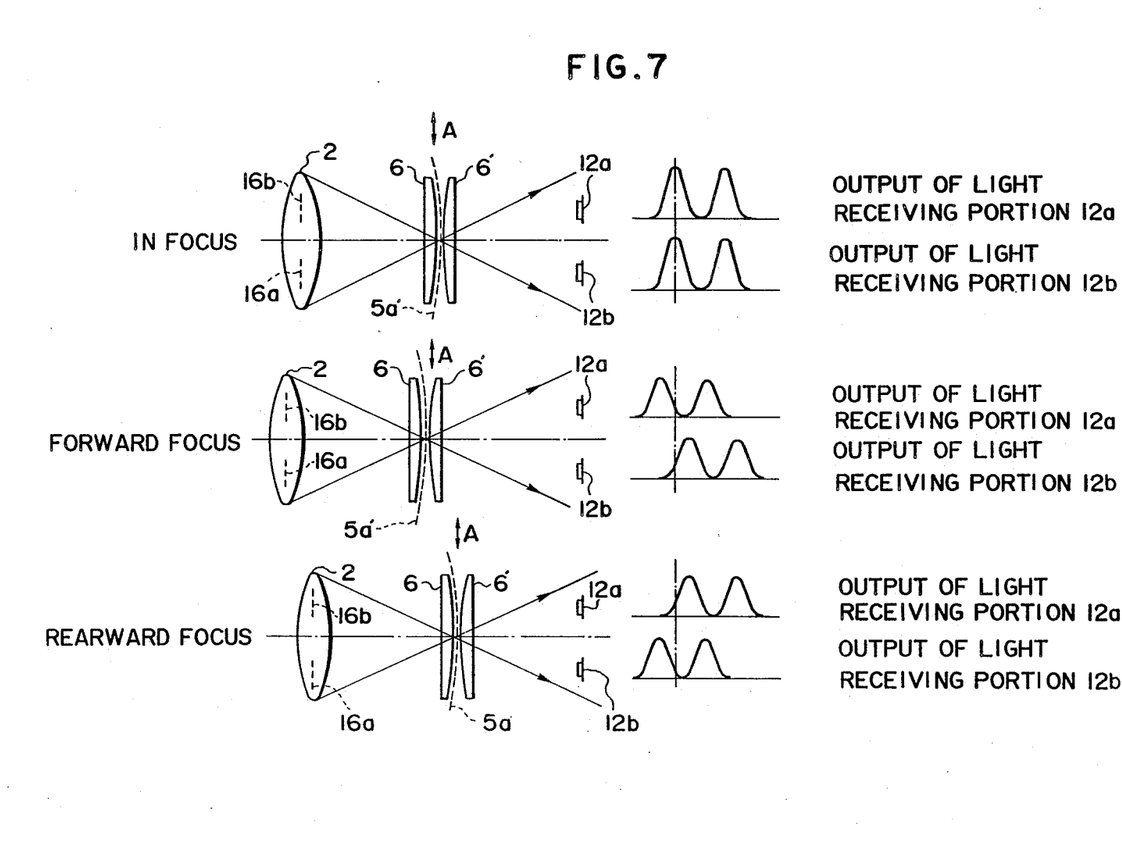
FIG. 7 is a schematic view showing the principle of the distance measuring method employed in the present invention.

Now reference is made to FIG. 7 for briefly explaining the principle of distance measurement according to the present invention. The slit-shaped light reflecting areas 5a are positioned in the vicinity of the imaging plane of the photographing lens 2, and the images of areas 16a, 16b of the exit pupil of the photographing lens 2 are respectively formed on the photosensor elements 12a, 12b. Thus, the light passing through the area 16b of the lens 2 enters the photosensor element 12b, while that passing through the area 16a enters the photosensor element 12a. For the purpose of simplicity, FIG. 7 shows the output wave forms in case the object consists of a point light source and the light reflecting areas 5a are oscillated in the direction A.

The output signals of the photosensor elements 12a, 12b are of the identical phase when the lens is exactly focused, but said output signals lose sharpness and show a phase difference when the lens is slightly out of focus. In the forward focus state the output of the element 12a is more advanced with respect to that of the element 12b, but, in the rearward focus state, this relation becomes inverse.

The phase difference of the outputs of the photosensor elements 12a, 12b, resulting from such a state of focus, is utilized for detecting the forward or rearward focus state, thereby determining the moving direction of the photographing lens 2 and stopping said lens at the focused position.

Figure 8:
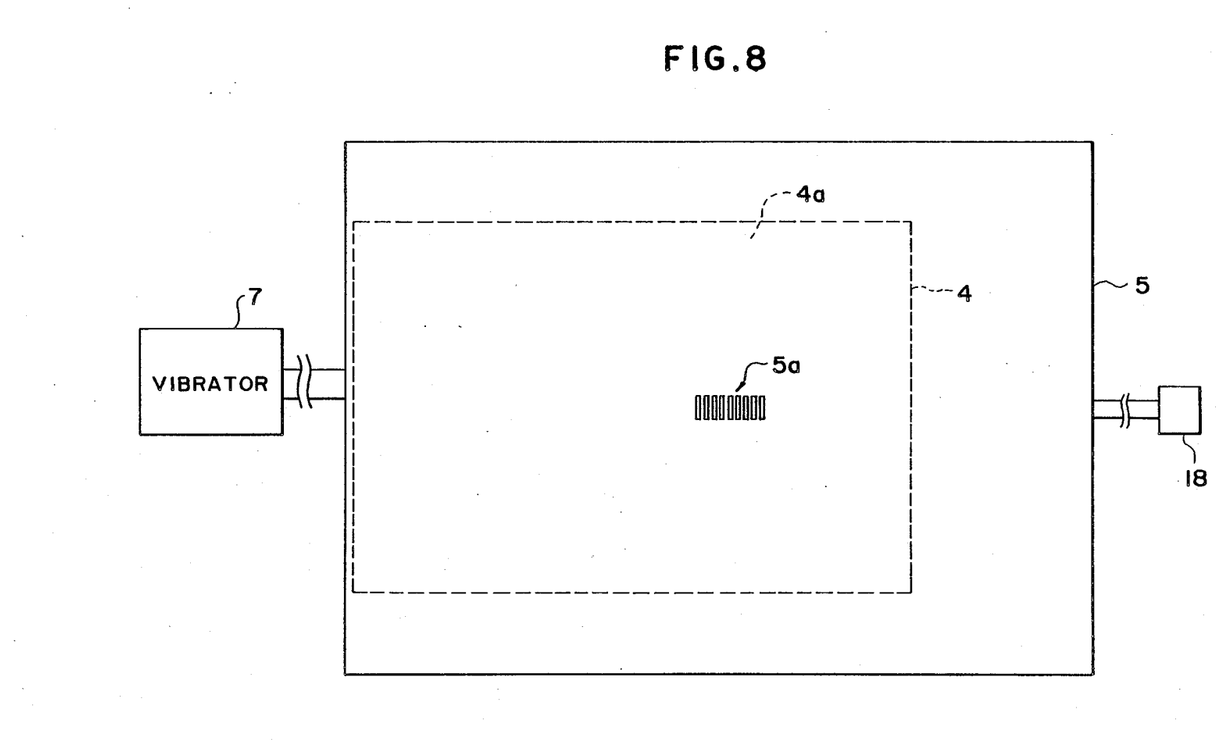
FIGS. 8 to 10 are views showing the change in position of the distance measuring area in the viewing field, in an embodiment of the present invention.

The foregoing is a case in which the distance measuring area (light reflecting areas 5a of slit form) is positioned at the center of the photographing field. However the position of the light reflecting areas 5a within the light entrance face 4a of the focus screen 4 can be easily made regulable by the operating member 18 by way of the oscillating plate 5 as shown in FIGS. 8 to 10, so that the distance measurement can be made at an arbitrary position within the photographing field.

Figure 9:
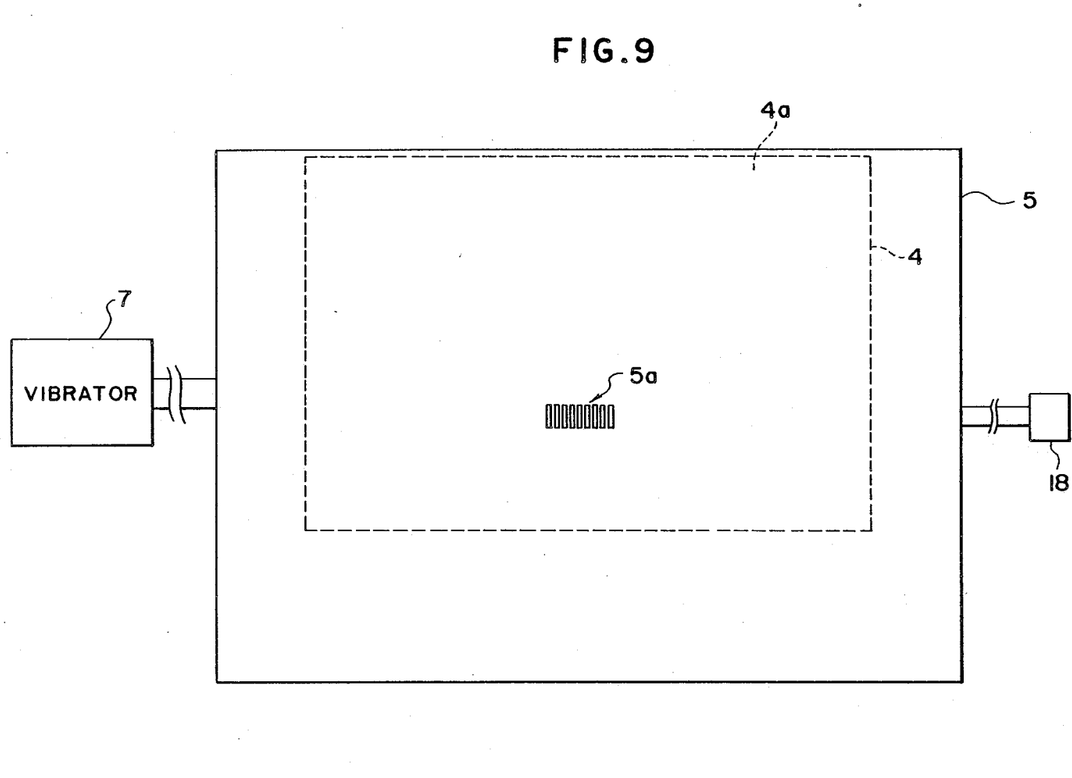
Figure 10:
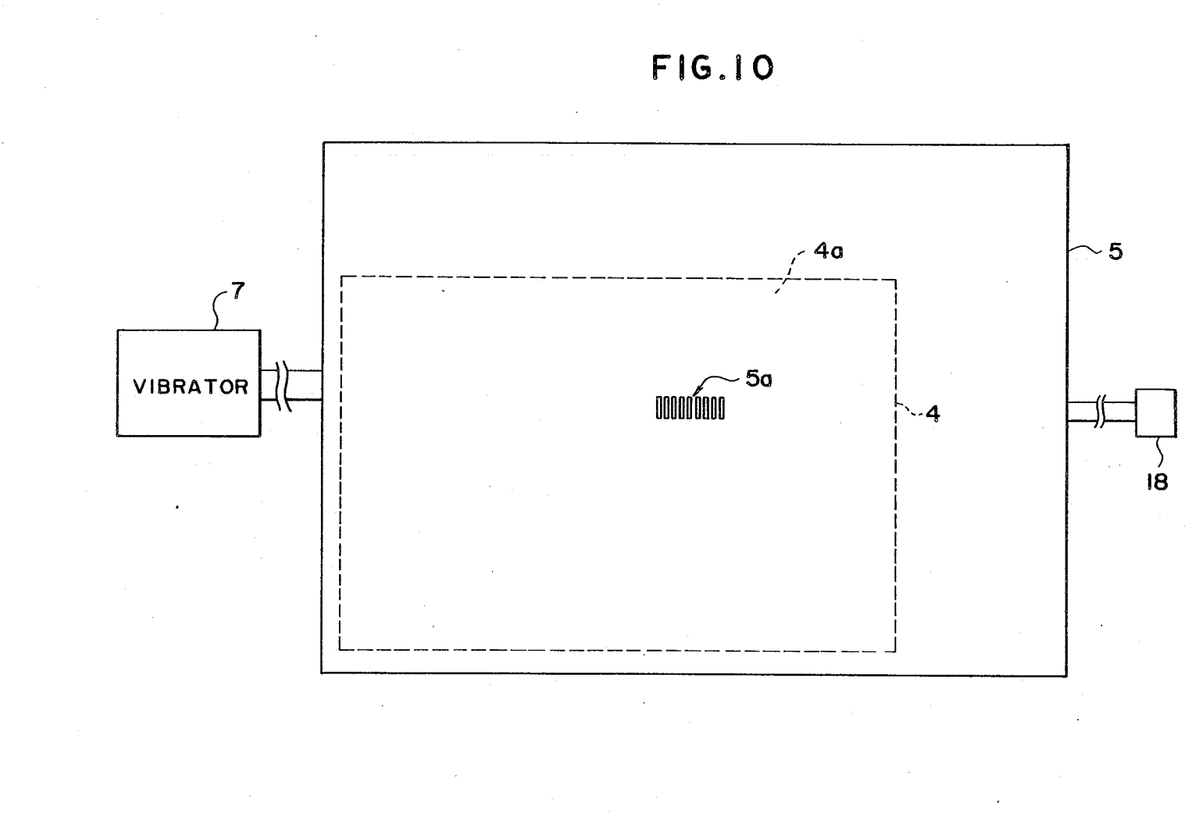
Figure 11:
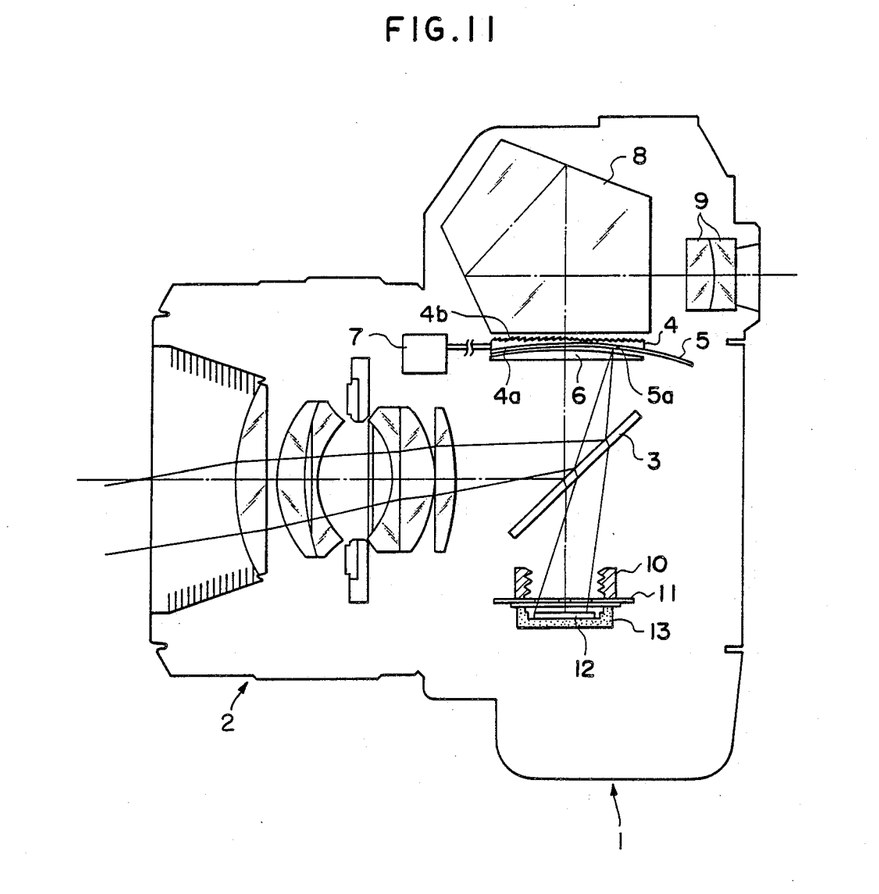
FIG. 11 is a view showing the optical path in case the distance measuring area is set at a position as shown in FIG. 8.

FIG. 11 shows the optical path of focus detection in case the light reflecting area 5a, or the distance measuring area, is moved to the end of the photographing field as shown in FIG. 9.

The present embodiment, in which the light reflecting areas 5a are positioned on an oscillating plate close to the light entrance face 4a (imaging plane) of the focus screen 4 and the light reflected from said light reflecting areas is guided through the movable mirror 3 to the photosensor 12 positioned at the bottom of said movable mirror 3 provides the following advantages:

(1) The light from the object can be guided to photosensor 12 by the reflection on the focusing screen 4, without the auxiliary movable mirror employed in the conventional single lens reflex camera, so that the distance measuring area can be set at an arbitrary position within the photographing field (the light reflecting area 5a being moved by the operating member 18 in the present embodiment) to enable focusing operation for objects of a wide range: and (2) said light reflecting areas 5a are visible in the viewing finder and can be utilized as a frame of distance measuring area.

In the present embodiment there has been explained the case of obtaining information on the focus state but a similar structure can be utilized for obtaining information on light intensity, thus enabling light measurement in an arbitrary area in the photographing field (spot light measurement or partial light measurement) with a simple structure.

In the present embodiment, the oscillating plate 5 close to the light entrance face 4a of the focusing screen 4 is made two-dimensionally movable for moving the distance measuring area, but a similar effect can be obtained by preparing plural focusing screens 4 having light reflecting areas 5a, formed for example by evaporation of aluminum, respectively at different positions on the light entrance face 4a, and by interchanging said focusing screens according to necessity. The interchanging of said focusing screens can be made, as in the conventional single lens reflex camera, through the lens mount or after the removal of the pentagonal prism. In this case the oscillating mechanism 7 oscillates the focusing screen 4.

Also the light reflecting member 5a is not limited to the slits explained before but can be composed of a single area.

Figure 12:
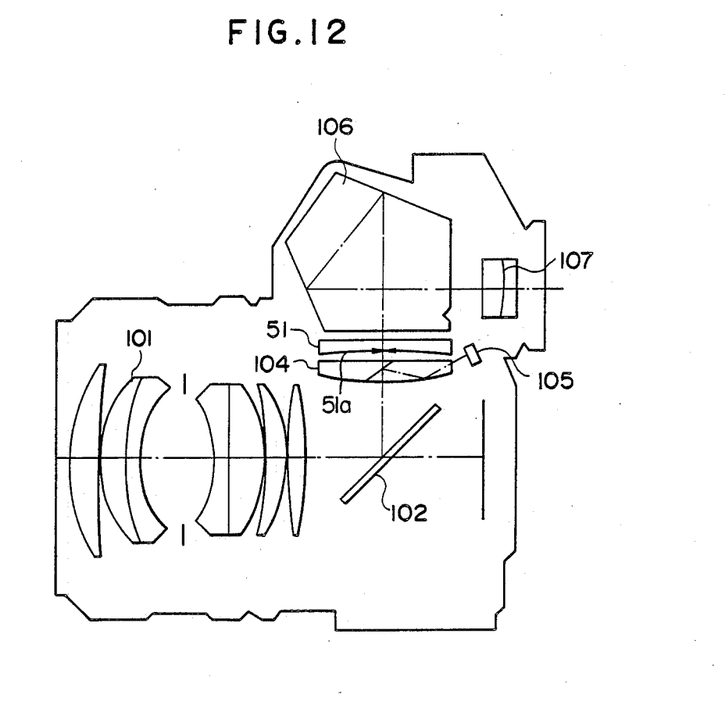
FIG. 12 is a cross-sectional view of a single lens reflex camera constituting another embodiment of the present invention.
Figure 13:
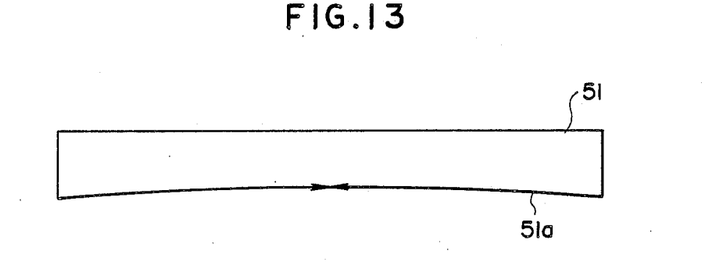
FIG. 13 is a magnified view of a focusing screen shown in FIG. 12.

FIG. 12 is a view corresponding to FIG. 14 and shows another embodiment of the present invention wherein the same components as those in FIG. 14 are represented by the same numbers.

Said embodiment is different from the structure shown in FIG. 14, in that the light entrance face 51a of the focusing plate 51 is formed matching the curvature of the image plane of the photographing lens 101 through the condenser lens 104. In this manner it is rendered possible to confirm the focus state of the image of the object, even if it is not positioned at the center of the focusing screen 51.

As explained in the foregoing, the information on the object can be obtained at an arbitrary position in the photographing field by a structure provided with a focusing screen for observing the focus state of the light coming from an object and passing through a photographing lens; a light reflecting member positioned in an arbitrarily selected position of an imaging face of the focusing screen for reflecting a part of the light incident to said imaging face; photoelectric converting means for converting the light coming from the object and reflected by said light reflecting member photoelectrically into object information for use in the photographing operation; and a half mirror positioned between said focusing screen and said photoelectric converting means for guiding the light coming from the object and passing through the photographing lens to said light reflecting member and said focusing screen, and guiding the light reflected by said light reflecting member to said photoelectric converting means, wherein said light reflecting member, constituting an area for detecting information on the object, can be set in an arbitrary position on the imaging face of the focusing screen.

Also the division of the exit pupil of the photographing lens can be achieved with a simple structure, as a condenser lens is positioned in the path of the light coming from the object, toward and returning from the light reflecting member, and is utilized not only as a part of the finder optical system but also as an optical system for dividing the exit pupil of the photographing lens, indispensable for the focus detecting device using the phase difference detecting method.

Furthermore, the frame indicating the object information detecting area in the finder can be made to coincide with the actual detecting area, since there are provided a light reflecting member formed on the imaging plane of the focusing screen and adapted to reflect a part of the light incident to said imaging plane and to be displayed, in the finder, as a frame for detecting the object information; and photoelectric converting means for photoelectric conversion of the light coming from the object and reflected by said light reflecting member, whereby said light reflecting member serves not only for the detection of object information but also for the display of a frame for detection of object information.

Furthermore, the focus state of the image of the object can be confirmed securely even outside the central portion of the focusing screen, since the imaging plane of the focusing screen is shaped corresponding to the curvature, formed by the condenser lens, of the focal plane of the photographing lens, whereby the image of the object formed by the photographing lens is formed with said focus state in any part of the focusing screen.

We claim:
1. A camera apparatus comprising:
a view finder having a focusing screen;
photosensing means for forming an electrical signal representing a focus adjusting state of an objective lens;
a beam splitter for distributing the light transmitted by said objective lens to said view finder and said photosensing means;

a translucent scanning member positioned between said beam splitter and said focusing screen, in the vicinity of said focusing screen, and having reflective areas formed as slits for directing the light to said photosensing means through said beam splitter;

scanning means for scanning said scanning member in the direction of array of said reflective areas; and setting means for setting the position of said scanning member in such a manner that said reflective areas are located in a desired position in the viewing field of said view finder.

2. A camera apparatus according to claim 1, wherein said photosensing means comprises a mask having two apertures, and photoelectric faces positioned behind said apertures.

3. A camera apparatus according to claim 2, wherein a matted face of said focusing screen is in mating relationship with a lens face of said condenser lens.

4. A camera apparatus according to claim 2, wherein said view finder comprises a condenser lens, positioned between said scanning member, and said beam splitter, for projecting said apertures of said photosensing means onto the pupil of the objective lens.

5. A camera apparatus comprising:
a viewer for observing a prospective image plane of an objective lens;
a light dividing mirror for reflecting the light toward said viewer;
a scanning plate having a reflective optical grating for scanning the image of an object on the prospective image plane;
light receiving means for receiving a light reflected by said optical grating through said light dividing mirror and for forming an electrical signal representing the focus adjusting state of the objective lens; and
means for setting said optical grating in a desired position in the viewing field of said viewer.

6. A camera apparatus according to claim 5, wherein said light receiving means comprises plural light receiving areas arranged in the scanning direction of said scanning plate.

7. A camera apparatus according to claim 6, further comprising a condenser lens positioned adjacent to said prospective image plane and adapted for projecting said light receiving area onto the pupil of said objective lens.

8. A camera comprising:
a viewer for observing a predetermined image surface of an objective lens;
a beam splitter for distributing a light flux passing through said objective lens to said viewer;
an optical member for receiving the light flux distributed by said beam splitter and having a plurality of light reflecting portions;
a scanning means for scanning said optical member in a direction of alignment of said light reflecting portions;
a photosensor for receiving light flux reflected by said light reflecting portions and passing through said beam splitter and for producing an electric signal representing a focus adjusting state of the objective lens; and
means for setting a position of said optical member so that said light reflecting portions occupy arbitrary positions in the view field of said viewer.

9. A camera according to claim 8, wherein said optical member includes a focusing screen.

10. A camera according to claim 9, wherein said focusing screen has a mat surface on which said light reflecting portions are provided.

11. A camera according to claim 8, further comprising a focusing screen provided in the vicinity of said predetermined image surface.

12. A camera according to claim 11, wherein said focusing screen has a curved surface along the curvature of said predetermined image surface.

13. A camera according to claim 8, further comprising a condenser lens located between said optical member and said beam splitter.

14. A camera according to claim 8, wherein said photosensor comprises a plurality of photosensing elements, and a plate having a plurality of apertures corresponding to said photosensing elements.

15. A camera according to claim 14, further comprising a condenser lens for reversely projecting an image of said plate reflected by said reflecting portions, said condenser lens being provided between said optical member and said beam splitter.

16. A camera according to claim 8, further comprising the objective lens.

* * * * *

UNITED STATES PATENT AND TRADEMARK OFFICE
CERTIFICATE OF CORRECTION

PATENT NO. : 4,963,912
DATED : October 16, 1990
INVENTOR(S) : Suda, et al.

It is certified that error appears in the above-identified patent and that said Letters Patent is hereby corrected as shown below:

COLUMN 2:

Line 20, "of distorted" should read --of providing a distorted--, and "pro-" should be deleted.

Line 21, "viding a" should be deleted.

Line 58, "of" should read --of the--.

Line 59, "the" should be deleted.

COLUMN 5:

Line 34, "operation." should read --operations--.

Signed and Sealed this

Twenty-eighth Day of April, 1992

Attest:

HARRY F. MANBECK, JR.

*Attesting Officer*  *Commissioner of Patents and Trademarks*